US009703917B2

(12) United States Patent
Lin et al.

(10) Patent No.: US 9,703,917 B2
(45) Date of Patent: Jul. 11, 2017

(54) IDENTIFICATION OF HIGH IMPEDANCE NODES IN A CIRCUIT DESIGN

(71) Applicant: Mentor Graphics Corporation, Wilsonville, OR (US)

(72) Inventors: Pole Shang Lin, Fremont, CA (US); Kuei Shan Wen, Fremont, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/600,430

(22) Filed: Jan. 20, 2015

(65) Prior Publication Data
US 2016/0210394 A1 Jul. 21, 2016

(51) Int. Cl.
G06F 17/50 (2006.01)

(52) U.S. Cl.
CPC ...... *G06F 17/5081* (2013.01); *G06F 17/5036* (2013.01); *G06F 17/5045* (2013.01); *G06F 2217/82* (2013.01)

(58) Field of Classification Search
CPC .................. G06F 17/5045; G06F 2217/82
USPC ............... 716/132–133, 138, 110, 111, 115
See application file for complete search history.

(56) References Cited

U.S. PATENT DOCUMENTS

| | | | | |
|---|---|---|---|---|
| 6,856,148 B2* | 2/2005 | Bodenstab | .......... | G06F 17/5036 324/713 |
| 7,233,889 B2* | 6/2007 | Takahashi | .......... | G06F 17/5036 703/14 |
| 8,595,669 B1* | 11/2013 | Keller | ................. | G06F 17/5036 716/106 |
| 2003/0083857 A1* | 5/2003 | Takahashi | ........... | G06F 17/5036 703/18 |
| 2003/0169059 A1* | 9/2003 | Bodenstab | .......... | G06F 17/5036 324/713 |
| 2005/0258862 A1* | 11/2005 | Rahim | ................ | G06F 17/5054 326/38 |
| 2009/0106720 A1* | 4/2009 | Nagata | ................ | G06F 17/5031 716/113 |
| 2011/0224965 A1* | 9/2011 | Hathaway | ........... | G06F 17/5036 703/16 |

OTHER PUBLICATIONS

W. Marshll Leach, Jr., "Fundamentals of low-noise analog circuit design", 1994, IEEE, pp. 1514-1538.*
"Detecting Leakage Problems in Low-Power Designs", Nikkei Electronics Asia, Sep. 2007, www.nikkeibp.com/neasia.

* cited by examiner

*Primary Examiner* — Stacy Whitmore
(74) *Attorney, Agent, or Firm* — Banner & Witcoff, Ltd.

(57) ABSTRACT

Various aspects of the disclosed techniques relate to techniques for identifying high-impedance nodes in a circuit design. Noise sources are added to nodes of interest in the circuit design. Voltage values at the nodes of interest are then computed in parallel. Based on the voltage values, high impedance nodes in the nodes of interest are identified.

20 Claims, 5 Drawing Sheets

Flow chart
400

Flow chart
400

IDENTIFICATION OF HIGH IMPEDANCE NODES IN A CIRCUIT DESIGN

FIELD OF THE INVENTION

The present invention is directed to computer-aided circuit design tools. Various aspects of the invention may be particularly useful for detecting leakage problems in low-power circuit designs.

BACKGROUND OF THE INVENTION

Mobile devices have become the largest market segment for semiconductor content in the electronics industry. Consumers are demanding more from their mobile devices: sleeker form factors, faster connectivity, richer and bigger displays, and better multimedia capabilities. In turn, their devices are demanding more processing horsepower. To meet this demand, the mobile industry is continually innovating to deliver the increasing performance while maintaining thermal efficiency and delivering longer battery life. Despite the advancements in device capabilities, long battery life remains the number one requested smartphone feature by consumers. This makes it mandatory for designers to incorporate more complex power-management techniques into their integrated circuits.

Advances in semiconductor fabrication technology are the key enabler for integration of more complex functions in systems-on-chips (SoC) in consumer electronics and other applications. However, scaling of MOS transistors to achieve higher functional density comes at a cost. Gate dielectrics are now only a few atomic layers thick. Leakage from porous gate dielectrics and shorter channel lengths can cause the static power dissipation of many chips to be greater than the dynamic power dissipation from active circuit operation, making the power management task even more challenging to designers.

One approach to reduce static power dissipation is by turning off large circuit blocks during idle periods. This power gating approach, however, may lead to high impedance (high-Z) nodes. Some of these high impedance nodes can result in excessive current paths. FIG. 2 illustrates an example of the high-Z node problem. In the circuit shown in the figure, two transistor pairs 210/220 and 240/250 operate as two invertors, respectively. Transistor 230 serves as a gating device between the two invertors. If node 215 is at 0V, node 225 is at Vdd due to inversion by the transistor pair 210/220. If node 235 is at Vdd, the transistor 230 is switched on and node 245 has the logic "1". The node 245 can be disconnected from the node 235 by switching off the transistor 230. This is achieved by changing the voltage at the node 235 to 0V. In such a state, any switching activities happening at and before the node 235 will not affect the transistors 240/250 and the part of the circuit driven by them in an ideal world.

In reality, however, the node 245 may not be able to retain the logic "1" over time because of leakage current through parasitic elements of the circuit. This may cause the PMOS (240) and NMOS (250) transistors to drift to a highly conductive state. A potentially destructive condition may result, with the power supply of the inverter 240/250 becoming essentially short-circuited to ground. The large time constant of the voltage drift at the node 245 exacerbates the power dissipation. One solution is to include a bus keeper or retention register to properly isolate high-impedance nodes from the active circuitry. The solution requires identification of high-impedance nodes in a circuit design.

To identify high-impedance nodes, a conventional method relies on calculating equivalent resistance at the node of interest: applying a stimulus current source; determining the voltage value at the node; and calculating the equivalent resistance by dividing the voltage value by the current value of the current source. This method is time-consuming due to its serial nature. The process has to be performed for each node of interest separately and there may be hundreds or thousands of nodes to check in a large design. Another drawback relates to its assumption that the node of interest is a Hi-Z node. This may lead to identification of some Hi-Z nodes that do not cause power dissipation problems. Detailed explanation is provided below.

BRIEF SUMMARY OF THE INVENTION

Various aspects of the disclosed techniques relate to techniques for identifying high-impedance nodes in circuit designs. In one aspect, there is a method, executed by at least one processor of a computer, comprising: adding noise sources to nodes of interest in a circuit design; computing voltage values at the nodes of interest in parallel; and identifying high impedance nodes in the nodes of interest based on the voltage values.

The noise sources may be represented by Norton equivalent circuits. The identifying may comprise: comparing the voltage values for the nodes of interest with equivalent voltage values for the noise sources; and designating nodes in the nodes of interest having voltage values within a predetermined range from the equivalent voltage values for the noise sources as high impedance nodes. The equivalent voltage values for the noise sources may be set at half of power supply voltage values In another aspect, there are one or more non-transitory computer-readable media storing computer-executable instructions for causing one or more processors to perform a method, the method comprising: adding noise sources to nodes of interest in a circuit design; computing voltage values at the nodes of interest in parallel; and identifying high impedance nodes in the nodes of interest based on the voltage values.

In still another aspect, there is system, comprising: a noise source addition unit configured to add noise sources to nodes of interest in a circuit design; a nodal voltage computation unit configured to compute voltage values at the nodes of interest in parallel; and a high impedance node identification unit configured to identify high impedance nodes in the nodes of interest based on the voltage values.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE INVENTION

Figure 1:
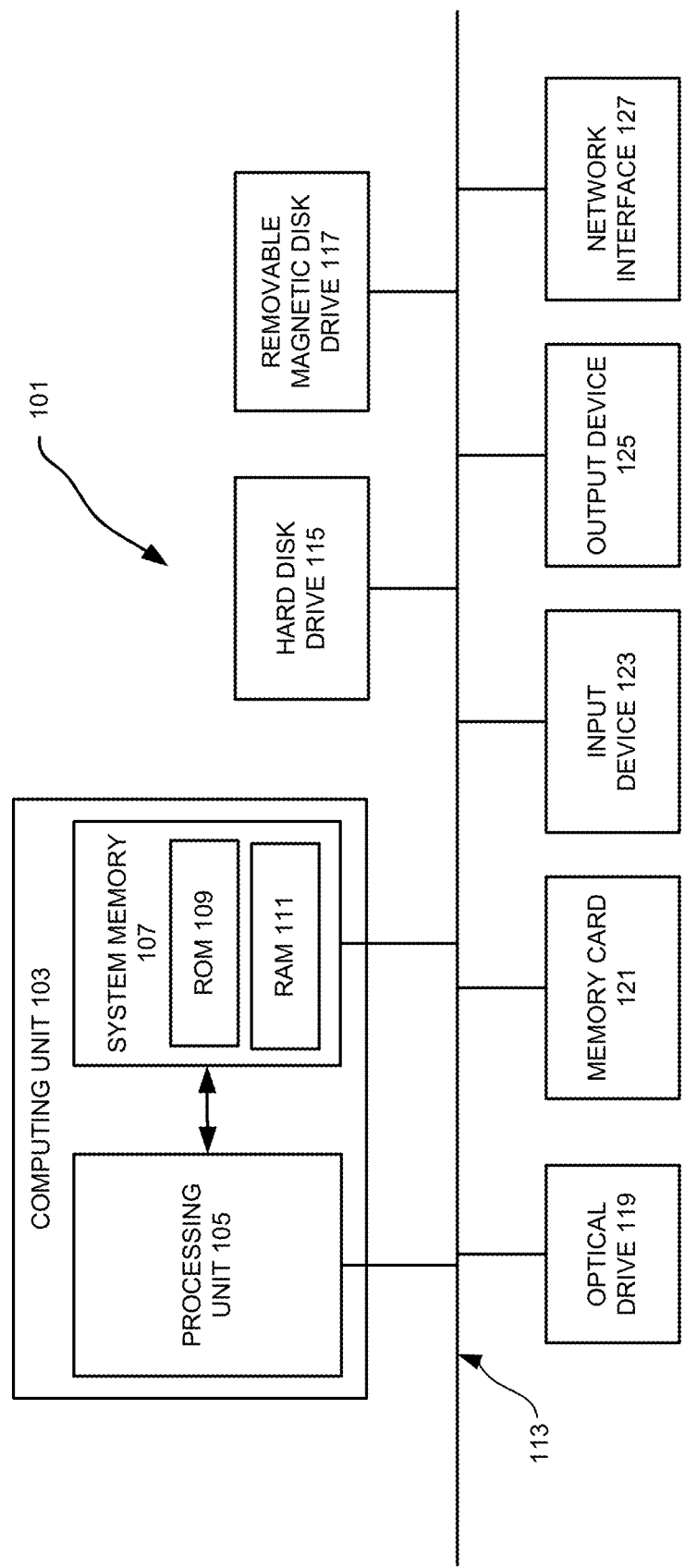
FIG. 1 illustrates a programmable computer system with which various embodiments of the invention may be employed.

Various aspects of the present invention relate to techniques for identifying high-impedance nodes in circuit designs. In the following description, numerous details are set forth for purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

The detailed description of a method or a device sometimes uses terms like "add", "compute" and "identify" to describe the disclosed method or the device function/structure. Such terms are high-level abstractions. The actual operations or functions/structures that correspond to these terms will vary depending on the particular implementation and are readily discernible by one of ordinary skill in the art. It should also be appreciated by one of ordinary skill in the art that the term "coupled" means "connected directly or indirectly."

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

Exemplary Operating Environment

Various embodiments of the invention may be implemented through the execution of software instructions by a computing device, such as a programmable computer. Further, various embodiments of the invention may be implemented by a computer executing various software instructions for performing the functionality of the invention, or by software instructions for performing the functionality of the invention stored on a computer-readable medium. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

High Impedance Node Detection Tool and Methods

Figure 3:
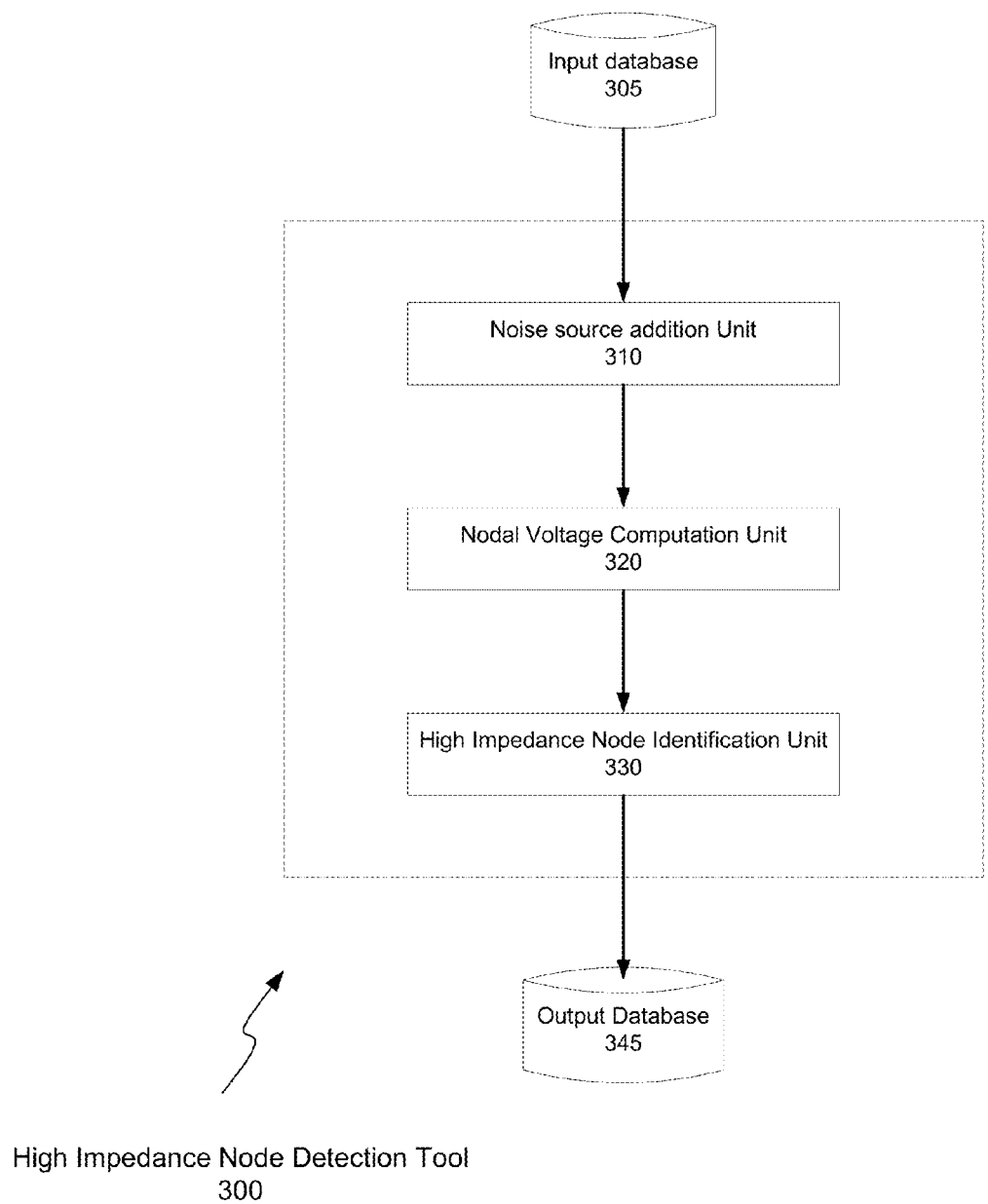
FIG. 3 illustrates an example of a high impedance node detection tool according to various embodiments of the invention.

FIG. 3 illustrates an example of a high impedance node detection tool according to various embodiments of the disclosed technology. As seen in the figure, the high impedance node detection tool 300 comprises three units: a noise source addition unit 310, a nodal voltage computation unit 320 and a high impedance node identification unit 330. Some implementations of the high impedance node detection tool 300 may cooperate with (or incorporate) one or more of an input database 305 and an output database 345.

As will be discussed in more detail below, the noise source addition unit 310 adds noise sources to nodes of interest in a circuit design. The nodal voltage computation unit 320 computes voltage values at the nodes of interest in parallel. Based on the voltage values, the high impedance node identification unit 330 identifies high impedance nodes in the nodes of interest.

As previously noted, various examples of the disclosed technology may be implemented by a multiprocessor computing system, such as the computer illustrated in FIG. 1. One or more of the noise source addition unit 310, the nodal voltage computation unit 320 and the high impedance node identification unit 330 may be implemented by executing programming instructions on one or more processors in a computer such as the computer illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the noise source addition unit 310, the nodal voltage computation unit 320 and the high impedance node identification unit 330. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

It also should be appreciated that, while the noise source addition unit 310, the nodal voltage computation unit 320 and the high impedance node identification unit 330 are shown as separate units in FIG. 3, a single servant computer (or a single processor within a master computer) may be used to implement both units at different times, or components of two or more of these units at different times.

With various examples of the disclosed technology, the input database 305 and the output database 345 may be implemented using any suitable computer readable storage device. That is, either of the input database 305 and the output database 345 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 305 and the output database 345 are shown as separate units in FIG. 3, a single data storage medium may be used to implement some or all of these databases.

Figure 4:
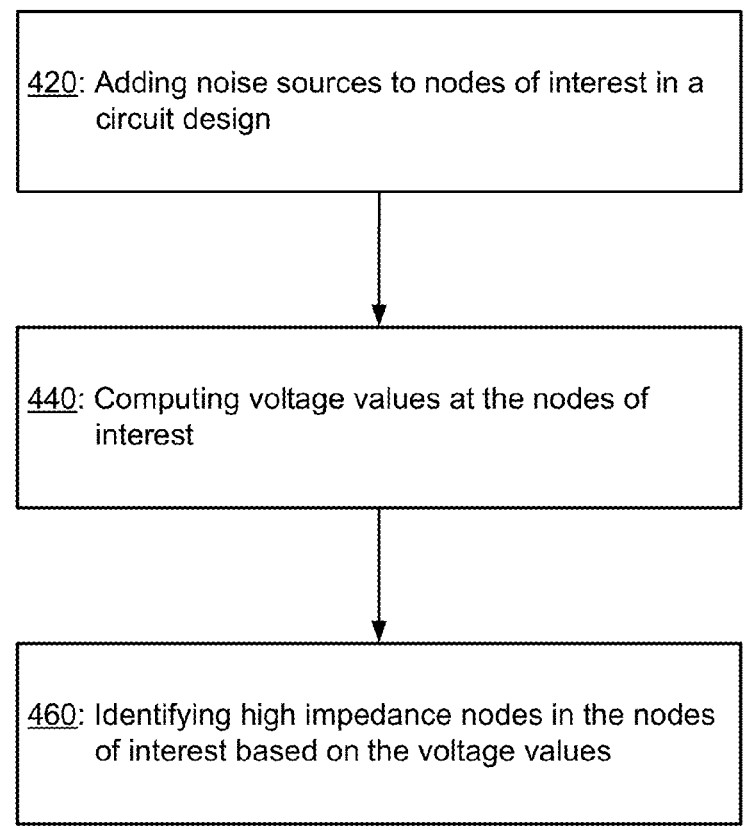
FIG. 4 illustrates a flowchart showing a process for identifying high impedance nodes that may be implemented according to various examples of the disclosed technology.

FIG. 4 illustrates a flowchart showing a process for identifying high impedance nodes that may be implemented according to various examples of the disclosed technology. For ease of understanding, methods for identifying high impedance nodes that may be employed according to various embodiments of the disclosed technology will be described with reference to the high impedance node detection tool 300 illustrated in FIG. 3 and the flow chart 400 in FIG. 4. It should be appreciated, however, that alternate implementations of a high impedance node detection tool may be used to perform the method for identifying high impedance nodes shown in the flow chart 400 according to various embodiments of the disclosed technology. In addition, it should be appreciated that implementations of the high impedance node detection tool 300 may be employed to implement methods for identifying high impedance nodes according to different embodiments of the disclosed technology other than the one illustrated by the flow chart 400 in FIG. 4.

Figure 2:
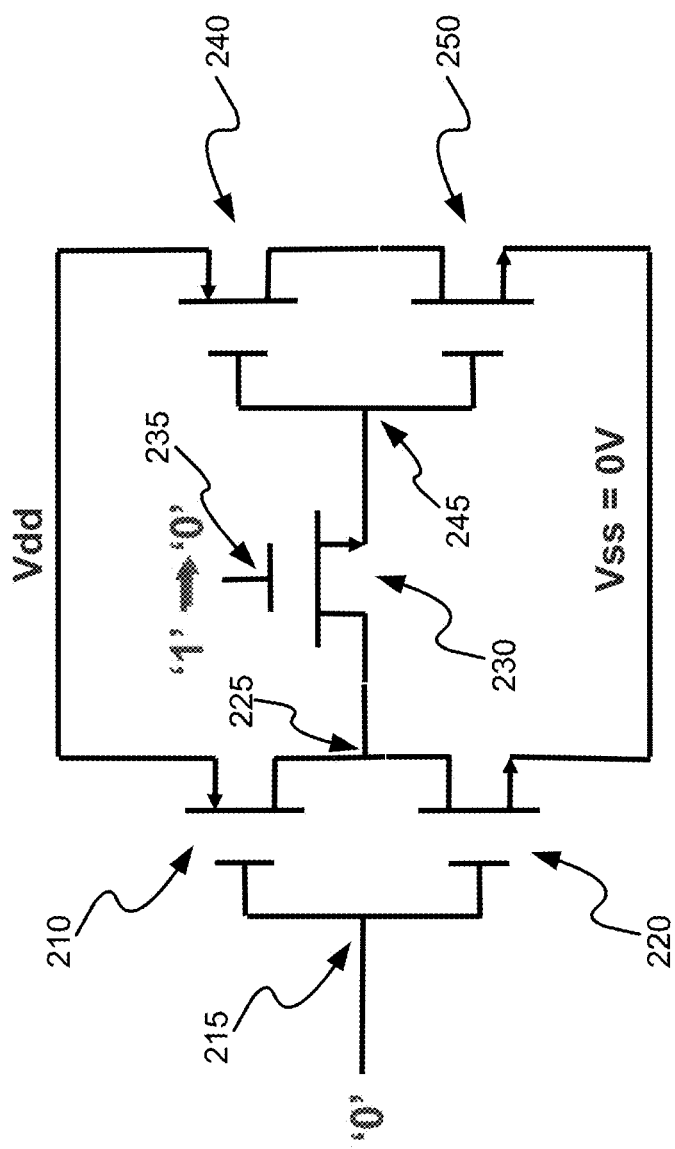
FIG. 2 illustrates an example of circuitry that is prone to the leakage problem due to a high impedance node.

Initially, in operation 420 of the flow chart 400, the noise source addition unit 310 adds noise sources to nodes of interest in a circuit design. One noise source may be added to each of the nodes of interest. The nodes of interest may be nodes that drive gates of one or more transistors. In FIG. 2, node 245 may be designated as a node of interest as it drives the gates of the transistors 240/250. Noise sources may be represented by Norton equivalent circuits. One advantage of using the Norton equivalent circuits is that they can readily be incorporated into the circuit model commonly used for simulating the circuit design without the noise sources. By contrast, adding the Thevenin equivalent circuits increases circuit nodes and the circuit model may have to be changed significantly. The equivalent resistance of a noise source is set at a value for detecting high impedance. If the equivalent resistance of the circuit driven by a node of interest is much larger than the equivalent resistance of the added noise source, the node may be identified as a high impedance node.

Next, the nodal voltage computation unit 320 computes voltage values at the nodes of interest in parallel. As discussed above, the noise sources may be incorporated into the circuit model for the circuit design. The circuit design with the added noise sources may then be simulated to derive the nodal voltage values. Conventional techniques may be employed by the nodal voltage computation unit 320. This computation can be straightforward when the circuit model is available.

Finally, in operation 330, the high impedance node identification unit 330 identifies high impedance nodes in the nodes of interest based on the voltage values. If the equivalent resistance of the circuit driven by a node of interest is much larger than the equivalent resistance of the added noise source, the voltage value at the node will be close to the equivalent voltage of the added noise source and the node may be identified as a high impedance node. If the equivalent resistance of the circuit is much smaller than the equivalent resistance of the added noise source, the voltage value at the node will be close to the voltage of the circuit without the noise source and the node may be identified as a non-high-impedance node. In some cases, the computed voltage value is not close to either the equivalent voltage of the added noise source or the voltage of the circuit without the noise source and further analysis may be needed. In these cases, the conventional method discussed early may be applied.

Figure 5:
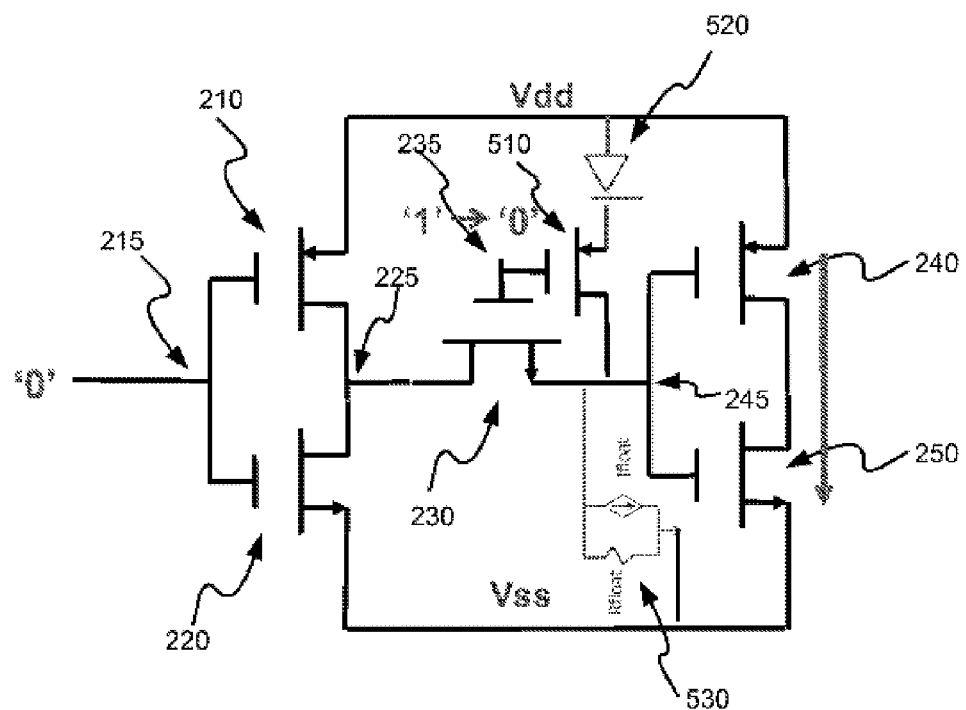
FIG. 5 illustrates an example of circuitry that has a "benign" high-impedance node.

The disclosed technology does not assume a high-impedance state at a node of interest. This allows separating "benign" high-impedance nodes from "hazardous" high-impedance detection of hazardous high impedance nodes by setting the equivalent voltage values of the added noise sources at certain values, for example. FIG. 5 illustrates a circuit modified from the circuit shown in FIG. 2. An additional transistor 510 and a diode 520 are connected between the node of interest 245 and Vdd (the power supply, assuming Vdd=3.3V). A noise source 530 is shown with the Norton equivalent circuit. When the node 235 changes from "1" to "0" to isolate the node 245 from the node 225, the transistor 510 is turned on and the voltage at the node 245 will be clamped at ~(Vdd −0.6V) due to the diode 520, which is not close to the equivalent voltage (Vdd/2=1.7V) of the noise source 530. As a result, the node 245 is not designated as a hazardous high impedance node as the PMOS (240) will not be turned on even in the presence of parasitic resistance and no leakage problem will occur.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim as our invention all that comes within the scope and spirit of these claims.

What is claimed is:

1. A method comprising:
adding, by a computing system, a noise source to a node in a circuit design;
setting the noise source to a threshold voltage that distinguishes a first set of high impedance nodes from a second set of high impedance nodes;
computing a value of a voltage at the node;
comparing the value of the voltage at the node to the threshold voltage; and
determining, based on the comparing, whether the node is in the first set of high impedance nodes or the second set of high impedance nodes.

2. The method recited in claim 1, wherein the determining comprises:
determining that the value of the voltage at the node is within a predetermined range from the threshold voltage.

3. The method recited in claim 1, wherein setting the noise source to the threshold voltage comprises setting the noise source to half of a voltage of a power supply in the circuit design.

4. The method recited in claim 1, wherein the node corresponds to a gate of a transistor.

5. The method of claim 1, further comprising adding a switch to the circuit design in response to the determining.

6. The method of claim 1, further comprising:
adding a second noise source to a second node in the circuit design;
setting the second noise source to the threshold voltage;
computing a value of a voltage at the second node;
comparing the value of the voltage at the second node to the threshold voltage; and
determining, based on the comparing, whether the second node is in the first set of high impedance nodes or the second set of high impedance nodes.

7. The method of claim 6, wherein the computing the value of the voltage at the node and the computing the value of the voltage at the second node comprise simulating the circuit design.

8. The method of claim 1, further comprising adding to the circuit design, in response to the determining, a bus-keeper or retention register for the node.

9. The method of claim 1, wherein the node is floating, disconnected, or not driven.

10. The method of claim 1, further comprising adding to the circuit design, in response to the determining, circuitry to bias the node.

11. The method of claim 1, wherein the first set of high impedance nodes comprises nodes that drift to a conductive state.

12. The method of claim 1, further comprising modifying the circuit design, in response to the determining, to isolate the node from active circuitry in the circuit design.

13. One or more non-transitory computer-readable media storing computer-executable instructions for causing one or more processors to perform a method, the method comprising:
adding a noise source to a node in a circuit design;
setting the noise source to a threshold voltage that distinguishes a first set of high impedance nodes from a second set of high impedance nodes;
computing a value of a voltage at the node;
comparing the value of the voltage at the node to the threshold voltage; and
determining, based on the comparing, whether the node is in the first set of high impedance nodes or the second set of high impedance nodes.

14. The one or more non-transitory computer-readable media recited in claim 13, wherein the noise source is represented by a Norton equivalent circuit.

15. The one or more non-transitory computer-readable media recited in claim 13, wherein the instructions for causing the one or more processors to perform the determining comprise instructions for causing the one or more processors to perform:
determining that the value of the voltage at the node is within a predetermined range from the threshold voltage.

16. A system, comprising:
at least one processor; and
at least one memory storing computer-executable instructions, that, when executed by the at least one processor, cause the system to:
add a noise source to a node in a circuit design;
set the noise source to a threshold voltage that distinguishes a first set of high impedance nodes from a second set of high impedance nodes;
compute a value of a voltage at the node;

compare the value of the voltage at the node to the threshold voltage; and determine, based on the comparing, whether the node is in the first set of high impedance nodes or the second set of high impedance nodes.

17. The system recited in claim 16, wherein the noise source is represented by a Norton equivalent circuit.

18. The system recited in claim 16, wherein the instructions that cause the system to determine whether the node is in the first set of high impedance nodes or the second set of high impedance nodes comprise instructions that cause the system to:

determine that the value of the voltage at the node is within a predetermined range from the threshold voltage.

19. The system recited in claim 16, wherein the instructions that cause the system to set the noise source to the threshold voltage comprise instructions that cause the system to set the noise source to half of a voltage of a power supply in the circuit design.

20. The system recited in claim 16, wherein the instructions that cause the system to compute the value of the voltage at the node comprise instructions that cause the system to simulate at least a portion of the circuit design.

* * * * *